United States Patent
Kanazirev et al.

(10) Patent No.: US 7,906,088 B2
(45) Date of Patent: Mar. 15, 2011

(54) METHOD OF REMOVING IMPURITIES FROM GAS OR LIQUID STREAMS USING COPPER OXIDE AND HALIDE SALT

(75) Inventors: Vladislav I. Kanazirev, Arlington Heights, IL (US); Peter Rumfola, III, Bueche, LA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/548,223

(22) Filed: Aug. 26, 2009

(65) Prior Publication Data
US 2010/0012578 A1    Jan. 21, 2010

Related U.S. Application Data

(63) Continuation-in-part of application No. 12/020,134, filed on Jan. 25, 2008, now abandoned, and a continuation-in-part of application No. 11/133,074, filed on May 19, 2005, now abandoned.

(51) Int. Cl.
*B01D 53/00*    (2006.01)

(52) U.S. Cl. ............. 423/210; 423/242.1; 423/244.01; 423/244.02; 423/244.03; 423/244.04; 423/244.06; 423/244.07; 423/230; 423/231; 423/232; 423/215.5; 423/87; 423/299; 423/511; 585/820; 585/821; 585/822; 585/823; 585/824

(58) Field of Classification Search ............... 423/242.1, 423/244.01–244.04, 244.06, 244.07, 230–232, 423/215.5, 210, 87, 299, 511; 585/820–824
See application file for complete search history.

(56) References Cited

U.S. PATENT DOCUMENTS
6,960,700 B1 * 11/2005 Sethna et al. ................. 585/822

FOREIGN PATENT DOCUMENTS
EP    865814    *  9/1998
JP    10-235185    *  9/1998

* cited by examiner

*Primary Examiner* — Steven Bos
(74) *Attorney, Agent, or Firm* — Mark Goldberg

(57) ABSTRACT

Mixing small amounts of an inorganic halide, such as NaCl, to basic copper carbonate followed by calcination at a temperature sufficient to decompose the carbonate results in a significant improvement in resistance to reduction of the resulting copper oxide. The introduction of the halide can be also achieved during the precipitation of the carbonate precursor. These reduction resistant copper oxides can be in the form of composites with alumina and are especially useful for purification of gas or liquid streams containing hydrogen or other reducing agents. These reduction resistant copper oxides can function at near ambient temperatures.

10 Claims, No Drawings

METHOD OF REMOVING IMPURITIES FROM GAS OR LIQUID STREAMS USING COPPER OXIDE AND HALIDE SALT

CROSS-REFERENCE TO RELATED APPLICATIONS

This application is a Continuation-In-Part of copending application Ser. No. 12/020,134 filed Jan. 25, 2008, which application is a Continuation-In-Part of application Ser. No. 11/133,074 filed May 19, 2005, now abandoned, the contents of which are hereby incorporated by reference in its entirety.

BACKGROUND OF THE INVENTION

Copper containing materials are widely used in industry as catalysts and sorbents. The water shift reaction in which carbon monoxide is reacted in presence of steam to make carbon dioxide and hydrogen as well as the synthesis of methanol and higher alcohols are among the most practiced catalytic processes nowadays. Both processes employ copper oxide based mixed oxide catalysts.

Copper-containing sorbents play a major role in the removal of contaminants, such as sulfur compounds and metal hydrides, from gas and liquid streams. One new use for such sorbents involve the on-board reforming of gasoline to produce hydrogen for polymer electrolyte fuel cells (PEFC). The hydrogen feed to a PEFC must be purified to less than 50 parts per billion parts volume of hydrogen sulfide due to the deleterious effects to the fuel cell of exposure to sulfur compounds.

Copper oxide (CuO) normally is subject to reduction reactions upon being heated but it also can be reduced even at ambient temperatures in ultraviolet light or in the presence of photochemically generated atomic hydrogen.

The use of CuO on a support that can be reduced at relatively low temperatures is considered to be an asset for some applications where it is important to preserve high dispersion of the copper metal. According to U.S. Pat. No. 4,863,894, highly dispersed copper metal particles are produced when co-precipitated copper-zinc-aluminum basic carbonates are reduced with molecular hydrogen without preliminary heating of the carbonates to temperatures above 200° C. to produce the mixed oxides.

However, easily reducible CuO is disadvantageous in some important applications. The removal of hydrogen sulfide ($H_2S$) from gas streams at elevated temperatures is based on the reaction of CuO with $H_2S$. Thermodynamic analysis shows that this reaction results in a low equilibrium concentration of $H_2S$ in the product gas even at temperatures in excess of 300° C. The residual $H_2S$ concentration in the product gas is much higher (which is undesirable) when the CuO reduces to Cu metal in the course of the process since reaction (1) is less favored than the CuO sulfidation to CuS.

$$2Cu+H_2S=Cu_2S+H_2 \quad (1)$$

Therefore, a reduction resistant CuO sorbent would be more suitable for exhaustive removal of $H_2S$ from synthesis gas assuring a purity of the $H_2$ product that is sufficient for fuel cell (PEFC) applications.

Copper oxide containing sorbents are well suited for removal of arsine and phosphine from waste gases released in the manufacture of semiconductors. Unfortunately, these gases often contain hydrogen, which in prior art copper oxide sorbents has triggered the reduction of the copper oxide. The resulting copper metal is less suitable as a scavenger for arsine and phosphine. A further detriment to the reduction process is that heat is liberated which may result in runaway reactions and other safety concerns in the process. These facts are other reasons that it would be advantageous to have a CuO containing scavenger that has an improved resistance towards reduction.

Combinations of CuO with other metal oxides are known to retard reduction of CuO. However, this is an expensive option that lacks efficiency due to performance loss caused by a decline of the surface area and the lack of availability of the CuO active component. The known approaches to reduce the reducibility of the supported CuO materials are based on combinations with other metal oxides such as $Cr_2O_3$. The disadvantages of the approach of using several metal oxides are that it complicates the manufacturing of the sorbent because of the need of additional components, production steps and high temperature to prepare the mixed oxides phase. As a result, the surface area and dispersion of the active component strongly diminish, which leads to performance loss. Moreover, the admixed oxides are more expensive than the basic CuO component which leads to an increase in the sorbent's overall production cost.

The present invention comprises a new method to increase the resistance toward reduction of CuO powder and that of CuO supported on a carrier, such as alumina. Addition of a small amount of a salt, such as sodium chloride (NaCl) to the basic copper carbonate ($CuCO_3.Cu(OH)_2$) precursor, followed by calcination at about 400° C. to convert the carbonate to the oxide, has been found to significantly decrease the reducibility of the final material. An increase of the calcination temperature of BCC beyond the temperature needed for a complete BCC decomposition also has a positive effect on CuO resistance towards reduction, especially in the presence of Cl.

Surprisingly, it has now been found that calcination of intimately mixed solid mixtures of basic copper carbonate (abbreviated herein as "BCC") and NaCl powder led to a CuO material that was more difficult to reduce than the one prepared from BCC in absence of any salt powder.

SUMMARY OF THE INVENTION

The present invention offers a method to increase the resistance of CuO and supported CuO materials against reduction by the addition of small amounts of an inorganic halide, such as sodium chloride to basic copper carbonate followed by calcinations for a sufficient time at a temperature in the range 280° to 500° C. that is sufficient to decompose the carbonate. These reduction resistant sorbents show significant benefits in the removal of sulfur and other contaminants from gas and liquid streams. These sorbents are particularly useful in applications where the sorbents are not regenerated. Sulfur contaminants that are removed include $H_2S$, light mercaptans and COS. Mercury can also be removed. The sorbents of the present invention operate to remove arsine and phosphine from synthesis gas or from liquid propylene at near ambient temperatures (10° to 45° C.). These materials also can operate at similar temperatures to remove hydrogen sulfide from natural gas. In addition, these materials can remove sulfur compounds from light hydrocarbons and naphtha at temperatures in the range of from about 80° to 250° C., preferably from about 100° to 160° C.

DETAILED DESCRIPTION OF THE INVENTION

Basic copper carbonates such as $CuCO_3.Cu(OH)_2$ can be produced by precipitation of copper salts, such as $Cu(NO)_3$, $CuSO_4$ and $CuCl_2$, with sodium carbonate. Depending on the conditions used, and especially on washing the resulting precipitate, the final material may contain some residual product from the precipitation process. In the case of the $CuCl_2$ raw material, sodium chloride is a side product of the precipitation process. It has been determined that a commercially available basic copper carbonate that had both residual chloride and sodium, exhibited lower stability towards heating and improved resistance towards reduction than another commercial BCC that was practically chloride-free.

In some embodiments of the present invention, agglomerates are formed comprising a support material such as alumina, copper oxide and halide salts. The alumina is typically present in the form of transition alumina which comprises a mixture of poorly crystalline alumina phases such as "rho", "chi" and "pseudo gamma" aluminas which are capable of quick rehydration and can retain substantial amount of water in a reactive form. An aluminum hydroxide $Al(OH)_3$, such as Gibbsite, is a source for preparation of transition alumina. The typical industrial process for production of transition alumina includes milling Gibbsite to 1-20 microns particle size followed by flash calcination for a short contact time as described in the patent literature such as in U.S. Pat. No. 2,915,365. Amorphous aluminum hydroxide and other naturally found mineral crystalline hydroxides e.g., Bayerite and Nordstrandite or monoxide hydroxides (AlOOH) such as Boehmite and Diaspore can be also used as a source of transition alumina. In the experiments done in reduction to practice of the present invention, the transition alumina was supplied by the UOP LLC plant in Baton Rouge, La. The BET surface area of this transition alumina material is about 300 $m^2/g$ and the average pore diameter is about 30 Angstroms as determined by nitrogen adsorption.

Typically a solid oxysalt of a transitional metal is used as a component of the composite material. "Oxysalt", by definition, refers to any salt of an oxyacid. Sometimes this definition is broadened to "a salt containing oxygen as well as a given anion". FeOCl, for example, is regarded as an oxysalt according this definition. For the purpose of the examples presented of the present invention, we used basic copper carbonate (BCC), $CuCO_3Cu(OH)_2$ which is a synthetic form of the mineral malachite, produced by Phibro Tech, Ridgefield Park, N.J. The particle size of the BCC particles is approximately in the range of that of the transition alumina, 1 to 20 microns. Another useful oxysalt would be Azurite—$Cu_3(CO_3)_2(OH)_2$. Generally, oxysalts of copper, nickel, iron, manganese, cobalt, zinc or a mixture of elements can be successfully used.

In the present invention, a copper oxide sorbent is produced by combining an inorganic halide with a basic copper carbonate to produce a mixture and then the mixture is calcined for a sufficient period of time to decompose the basic copper carbonate. The preferred inorganic halides are sodium chloride, potassium chloride or mixtures thereof. Bromide salts are also effective. The chloride content in the copper oxide sorbent may range from 0.05 to 2.5 mass-% and preferably is from 0.3 to 1.2 mass-%. Various forms of basic copper carbonate may be used with a preferred form being synthetic malachite, $CuCO_3Cu(OH)_2$.

The copper oxide sorbent that contains the halide salt exhibits a higher resistance to reduction than does a similar sorbent that is made without the halide salt. The copper oxide sorbent of the present invention is useful in removing arsenic, phosphorus and sulfur compounds from gases or liquids. It is particularly useful in removing the arsine form of arsenic that poisons the catalyst even when this impurity is found in very low concentrations in olefin feeds used for polymer production. In addition, the sorbent is useful in applications where the adsorbent is not regenerated. The removal of $H_2S$, light mercaptans and COS is an advantageous use of the adsorbent. Mercury can also be removed by this adsorbent.

Arsine ($AsH_3$) and phosphine ($PH_3$) can be successfully removed from synthesis gas at nearly ambient temperature in the advanced processes of methanol production such as LPMEOH using guard beds containing supported CuO. provided that the active phase CuO does not reduce to Cu metal in the course of the removal process. Typically, the synthesis gas contain 68% $H_2$, 23% CO, 5% $CO_2$ and 4% $N_2$ at a pressure of about 51,711 kPa (7500 psig) and GHSV (gas hourly space velocity) of 3000 to 7000 $hr^{-1}$. The adsorbent according the invention would resist the reduction of CuO.

Arsine and Phosphine can be also removed efficiently from liquid propylene at nearly ambient temperature and LHSV from 1 to 20 $hr^{-1}$ and pressure 345 to 1379 kPa (50 to 200 psig) with CuO adsorbents that are sufficiently resistant to reduction in order to prevent the loss of active phase due to slow reduction of CuO.

CuO containing materials are also used as guard beds for $H_2S$ removal from natural gas. This process also occurs at nearly ambient temperatures and pressures in the range of 689 to 3447 kPa (100 to 500 psig). Any reduction of the active phase of the adsorbent CuO would lead to decreased S capacity since $Cu_2S$ instead of CuS would be the final state of the spent adsorbent. The improved adsorbent according to the invention would resist the reduction.

The CuO containing guard beds in which the CuO phase is resistant to reduction can be applied also for mercury removal from hydrocarbon feeds which contain very low content of sulfur. These application take place also at temperatures below 100° C. whereas the S in the feed converts CuO to CuS. The latter is the active phase for Hg removal. An adsorbent in which CuO does not have sufficient resistance to reduction would produce $Cu_2S$ upon sulfidation. It is known that $Cu_2S$ is totally useless as an active phase for Hg removal because of thermodynamic restrictions.

There also numerous other applications in which resistant to reduction supported CuO are very useful for protecting noble metal catalysts from contaminants. All these applications are practiced at temperatures below 300° C.

Table 1 lists characteristic composition data of three different basic copper carbonate powder samples designated as Samples 1, 2 and 3.

TABLE 1

| Composition, Mass-% | Sample Number | | |
| --- | --- | --- | --- |
|  | 1 | 2 | 3 |
| Copper | 55.9 | 55.4 | 54.2 |
| Carbon | 5.0 | 5.1 | 5.1 |
| Hydrogen | 1.3 | 1.2 | 1.2 |
| Sodium | 0.23 | 0.51 | 0.51 |
| Chloride | 0.01 | 0.32 | 0.28 |
| Sulfate | 0.06 | 0.01 | 0.02 |

All three samples were subjected to thermal treatment in nitrogen in a microbalance followed by reduction in a 5% $H_2$-95% $N_2$ stream. As the thermogravimetric (TG) analysis showed, chloride-containing BCC Samples 2 and 3 decompose to CuO at about 40° to 50° C. lower temperatures than Sample 1. On the other hand, the latter sample was found to reduce more easily in presence of $H_2$ than the Cl-containing samples. The reduction process completed with Sample 1 at 80° to 90° C. lower temperature than in the case of the Cl-containing Samples 2 and 3. The TG experiment was carried out with a powder sample of about 50 mg wherein the temperature was ramped to 450° C. at a rate of increase of 10° C. per minute followed by a 2 hour hold and then cooling down to 100° C. A blend of 5% $H_2$ with the balance $N_2$ was then introduced into the microbalance and the temperature was increased again at a rate of 10° C. per minute to 450° C. The total weight loss of the samples in $N_2$ flow reflected the decomposition of BCC to the oxide while the weight loss in the presence of a $H_2$—$N_2$ mixture corresponded to the reduction of CuO to Cu metal.

In the present invention it has been found that the residual Cl impurity caused the observed change in BCC decomposition. This reduction behavior was confirmed by preparing a mechanical mixture of NaCl and the Cl-free Sample 1 and then subjecting the mixture to a TG decomposition reduction test. In particular, 25 mg of NaCl reagent was intimately mixed with about 980 mg BCC (Sample 1). The mixture was homogenized for about 2 minutes using an agate mortar and pestle prior to TG measurements.

It was found that the addition of NaCl makes Sample 1 decompose more easily but also makes it resist reduction to a higher extent than in the case where no chloride is present. The observed effect of NaCl addition is definitely beyond the range of experimental error.

The exact mechanism of the chloride action is unknown at this point. We hypothesize that the salt additive may incorporate in some extent in the structure of the source BCC weakening it and making it more susceptible to decomposition. On the other hand, the copper oxide produced upon thermal decomposition of BCC now contains an extraneous species that may affect key elements of the metal oxide reduction process such as $H_2$ adsorption and activation and penetration of the reduction front throughout the CuO particle as well. We do not wish to favor any particular theory of Cl action at this point.

The series of experiments in which NaCl was added was conducted in a different TG-setup than that used to generate the data of decomposition without addition to NaCl. The setup consisted of a Perkin Elmer TGA-1 microbalance operated in a helium flow. The sample size was typically 8 to 10 mg. Both decomposition and reduction runs were conducted with one sample at a heating rate of about 25° C./min followed by short hold at 400° C. After cooling to about ambient temperature, 1.5% $H_2$-balance He—$N_2$ mixture was used as a reduction agent.

It was found that the Cl treated sample reduced at a temperature which is nearly 100° C. higher than the original untreated BCC sample. It is evident that the reduction process with the former sample does not complete while ramping the temperature to 400° C. With the non-treated samples, the reduction concludes at about 350° C. while the sample is still heated up.

Table 2 presents data on several samples produced by mixing different amounts of NaCl or KCl powder to the BCC Sample 1 listed in Table 1. The preparation procedure was similar to that described in paragraph [0019].

TABLE 2

| Sample | Basic Cu carbonate, (g) | NaCl (g) | KCl (g) | Pre-treatment temperature, ° C. | Characteristic temperature, ° C. BCC decomposition* | Characteristic temperature, ° C. CuO reduction** |
|---|---|---|---|---|---|---|
| 1 | #1 only | 0 | 0 | 400 | 335 | 256 |
| 2 | 9.908 | 0.103 | 0 | 400 | 296 | 352 |
| 3 | 9.797 | 0.201 | 0 | 400 | 285 | 368 |
| 4 | 9.809 | 0.318 | 0 | 400 | 278 | 369 |
| 5 | 9.939 | 0 | 0.150 | 400 | 282 | 346 |
| 6 | 9.878 | 0 | 0.257 | 400 | 279 | 378 |
| 7 | 0.981 | 0 | 0.400 | 400 | 279 | 382 |
| 8 | #1 only | 0 | 0 | 500 | 333 | 310 |
| 9 | 9.797 | 0.201 | 0 | 500 | 282 | 386 |

*Temperature at which 20 mass-% sample weight is lost due to BCC decomposition
**Temperature at which 5% sample weight is lost due to CuO reduction The data also shows that both NaCl and KCl are effective as a source of Cl. Adding up to 1% Cl by weight affects strongly both decomposition temperature of BCC and the reduction temperature of the resulting CuO. It can be also seen that the combination of a thermal treatment at a temperature which is higher than the temperature needed for complete BCC decomposition and Cl addition leads to the most pronounced effect on CuO resistance towards reduction—compare Samples 3, 8 and 9 in Table 2.

Finally, the materials produced by conodulizing the CuO precursor—BCC with alumina followed by curing and activation retain the property of the basic Cu carbonate used as a feed. The BCC that is more resistant to reduction yielded a CuO-alumina sorbent which was difficult to reduce.

The following example illustrates one particular way of practicing this invention with respect of CuO-alumina composites: About 45 mass-% basic copper carbonate (BCC) and about 55 mass-% transition alumina (TA) produced by flash calcination were used to obtain 7×14 mesh beads by rotating the powder mixture in a commercial pan nodulizer while spraying with water. About 1000 g of the green beads were then additionally sprayed with about 40 cc 10% NaCl solution in a laboratory rotating pan followed by activation at about 400° C. The sample was then subjected to thermal treatment & reduction in the Perkin Elmer TGA apparatus as described earlier. Table 3 summarizes the results to show the increased resistance towards reduction of the NaCl sprayed sample.

TABLE 3

| Sample | Preparation condition | Characteristic temperature of TGA analysis, ° C. | |
|---|---|---|---|
| | | BCC decomposition* | CuO reduction** |
| 10 | Nontreated | 341 | 293 |
| 11 | Nontreated + activation | n/a | 302 |
| 12 | NaCl treated | 328 | 341 |
| 13 | NaCl treated + activation | n/a | 352 |

*Temperature at which 20 mass-% sample weight is lost due to BCC decomposition
**Temperature at which 5% sample weight is lost due to CuO reduction A cost-effective way to practice the invention is to leave more NaCl impurity in the basic Cu carbonate during the production. This can be done, for example, by modifying the procedure for the washing of the precipitated product. One can then use this modified BCC precursor to produce the sorbents according to our invention.

Another way to practice the invention is to mix solid chloride and metal oxide precursor (carbonate in this case) and to subject the mixture to calcinations to achieve conversion to oxide. Prior to the calcinations, the mixture can be co-formed with a carrier such as porous alumina. The formation process can be done by extrusion, pressing pellets or nodulizing in a pan or drum nodulizer.

Still another promising way to practice the invention is to co-nodulize metal oxide precursor and alumina by using a NaCl solution as a nodulizing liquid. The final product containing reduction resistant metal (copper) oxide would then be produced after proper curing and thermal activation.

The invention claimed is:

1. A method of removing from a gas or liquid stream at least one impurity selected from the group consisting of arsine, phosphine, $H_2S$ and COS comprising contacting said gas or liquid with a sorbent consisting of copper oxide and at least one inorganic halide wherein said sorbent is not regenerated.

2. The method of claim 1 wherein said inorganic halide comprises sodium chloride, potassium chloride or a mixture thereof.

3. The method of claim 1 wherein said sorbent has a chloride content from 0.05 to 2.5 mass-%.

4. The method of claim 1 wherein said sorbent has a chloride content from 0.3 to 1.2 mass-%.

5. The method of claim 1 wherein the copper oxide is made from a basic copper carbonate comprising $CuCO_3Cu(OH)_2$.

6. The method of claim 1 wherein said impurity is arsine.

7. The method of claim 1 wherein said gas or liquid stream comprises at least one olefin.

8. The method of claim 1 wherein said gas or liquid is at a temperature from about 10° C. to 45° C.

9. The method of claim 1 wherein said gas or liquid is at a temperature from about 80° C. to 250° C.

10. The method of claim 1 wherein said gas or liquid is selected from the group consisting of methanol, natural gas, propylene, and naphtha.

* * * * *